US010029543B2

(12) United States Patent
Egusa

(10) Patent No.: US 10,029,543 B2
(45) Date of Patent: Jul. 24, 2018

(54) VEHICLE SUN VISOR

(71) Applicant: Toyota Jidosha Kabushiki Kaisha, Toyota-shi Aichi-ken (JP)

(72) Inventor: Shinobu Egusa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/369,160

(22) Filed: Dec. 5, 2016

(65) Prior Publication Data

US 2017/0158153 A1 Jun. 8, 2017

(30) Foreign Application Priority Data

Dec. 7, 2015 (JP) ................................. 2015-238879

(51) Int. Cl.
*B60J 3/02* (2006.01)
*B60R 21/055* (2006.01)
*B60R 21/00* (2006.01)

(52) U.S. Cl.
CPC ............ *B60J 3/0278* (2013.01); *B60J 3/026* (2013.01); *B60J 3/0217* (2013.01); *B60J 3/0282* (2013.01); *B60R 21/055* (2013.01); *B60R 2021/0004* (2013.01); *B60R 2021/0009* (2013.01)

(58) Field of Classification Search
CPC .............................. B60J 3/0278; B60J 7/0217
USPC ................................................. 296/97.1, 97.9
See application file for complete search history.

(56) References Cited

U.S. PATENT DOCUMENTS

| 3,751,106 | A | * | 8/1973 | Mahler | B60J 3/02 160/385 |
| 4,842,321 | A | * | 6/1989 | Baumert | B60J 3/0278 16/321 |
| 4,934,802 | A | * | 6/1990 | Fluharty | G02B 7/1824 248/481 |
| 5,720,509 | A | * | 2/1998 | Binish | B60J 3/0282 296/97.5 |
| 6,679,538 | B1 | * | 1/2004 | Sturt | B60J 3/0217 296/187.05 |
| 6,921,121 | B2 | * | 7/2005 | Schneider | B60J 3/0204 280/730.1 |
| 7,213,865 | B2 | * | 5/2007 | Torii | B29C 49/20 296/97.1 |

(Continued)

FOREIGN PATENT DOCUMENTS

| JP | S62129318 U | 8/1987 |
| JP | H01108155 U | 7/1989 |

(Continued)

*Primary Examiner* — Dennis H Pedder
(74) *Attorney, Agent, or Firm* — Dinsmore & Shohl LLP

(57) ABSTRACT

A vehicle sun visor including: a sun visor main body that is formed in a substantially rectangular plate shape that extends in a vehicle transverse direction, the sun visor main body having one long-side edge portion that is pivotably supported at a front portion of a ceiling inside a vehicle cabin, and the sun visor main body being set in a storage position along the ceiling as a result of another long-side edge portion being pivoted towards a vehicle body rear side; and a protruding portion that is formed on a bottom surface of the sun visor main body in a case in which the sun visor main body has been set in the storage position, and that protrudes towards a vehicle bottom side when seen in a side view from the vehicle transverse direction.

12 Claims, 5 Drawing Sheets

(56) References Cited

U.S. PATENT DOCUMENTS

| | | | |
|---|---|---|---|
| 2003/0091201 A1* | 5/2003 | Dykstra | B60R 1/008 381/86 |
| 2006/0175861 A1 | 8/2006 | Ikeda et al. | |
| 2009/0218845 A1* | 9/2009 | Rockafellow | B60J 3/0282 296/97.5 |
| 2015/0291098 A1* | 10/2015 | Pendlebury | B60R 1/008 296/97.5 |

FOREIGN PATENT DOCUMENTS

| | | |
|---|---|---|
| JP | H04119212 U | 10/1992 |
| JP | H05-085166 A | 4/1993 |
| JP | 2003-039470 A | 2/2003 |
| JP | 2006-151139 A | 6/2006 |
| JP | 2006-218884 A | 8/2006 |

* cited by examiner

VEHICLE SUN VISOR

CROSS-REFERENCE TO RELATED APPLICATION

This application is based on and claims priority under 35 USC 119 from Japanese Patent Application No. 2015-238879 filed on Dec. 7, 2015, the disclosure of which is incorporated by reference herein.

BACKGROUND

Technical Field

The present disclosure relates to a vehicle sun visor.

Related Art

A sun visor structure in which, in a sun visor main body portion that is formed in a plate shape that includes an in-built frame component, a central area that extends from a substantially central location along a long-side edge portion around which the sun visor pivots to another long-side edge portion on the opposite side from the aforementioned long-side edge portion is formed having less rigidity than the areas surrounding it is known conventionally (see, for example, Japanese Patent Application Laid-Open (JP-A) No. 5-85166).

According to this sun visor structure, in a vehicle frontal collision, when the vehicle occupants make an inertial motion in a forward direction, because the head portion of the vehicle occupants collides with the central area of the sun visor main body portion, the impact force received by the head portion can be alleviated.

However, in a vehicle diagonal frontal collision, when the vehicle occupants make an inertial motion in a diagonally forward direction, there is a possibility that the head portion of the vehicle occupants will impact against the long-side edge portion around which the sun visor pivots. In this case, it becomes difficult to alleviate the impact force received by the head portion.

It is therefore an object of the present disclosure to provide a sun visor for a vehicle that is able to alleviate the impact force received by the head portion of a vehicle occupant even when the vehicle occupants make an inertial motion in a diagonally forward direction in a vehicle diagonal frontal collision.

SUMMARY

In order to achieve the above-described object, a vehicle sun visor of a first aspect relating to the present disclosure comprising: a sun visor main body that is formed in a substantially rectangular plate shape that extends in a vehicle transverse direction, the sun visor main body having one long-side edge portion that is pivotably supported at a front portion of a ceiling inside a vehicle cabin, and the sun visor main body being set in a storage position along the ceiling as a result of another long-side edge portion being pivoted towards a vehicle body rear side; and a protruding portion that is formed on a bottom surface of the sun visor main body in a case in which the sun visor main body has been set in the storage position, and that protrudes towards a vehicle bottom side when seen in a side view from the vehicle transverse direction.

According to the first aspect of the present disclosure, the protruding portion that protrudes towards the vehicle body bottom side when seen in a side view from the vehicle transverse direction is formed on a bottom surface of the sun visor main body when this is set in the storage position. Accordingly, even if the vehicle is in a diagonal frontal collision and the vehicle occupant makes an inertial movement in a diagonally forward direction, or if the vehicle is in a frontal collision and the vehicle occupant makes an inertial movement in a forward direction, the head portion of the vehicle occupant collides with the protruding portion of the sun visor main body, and is prevented from striking the one long-side edge portion that forms the pivoting center of the sun visor main body. Accordingly, the impact force received by the head portion of the vehicle occupant is alleviated.

The vehicle sun visor according to the second aspect of the present disclosure, wherein the protruding portion is formed as a result of the sun visor main body being bent substantially V shape when seen in a side view from the vehicle transverse direction.

According to the second aspect of the present disclosure, the protruding portion is formed by bending the sun visor main body in a substantially V shape when seen in a side view from the vehicle transverse direction. Accordingly, if the head portion of the vehicle occupant collides with the protruding portion, the sun visor main body is elastically deformed towards the vehicle body top side, so that the impact force is effectively absorbed. Accordingly, the impact force received by the head portion of the vehicle occupant is alleviated more effectively.

The vehicle sun visor According to the third aspect of the present disclosure, wherein a vanity mirror is pivotably provided, on the ceiling, independently from the sun visor main body.

According to the third aspect of the present disclosure, the vanity mirror is provided independently from the sun visor main body such that it is able to pivot on the ceiling of the vehicle cabin. Accordingly, in comparison with a structure in which the vanity mirror is provided integrally with the sun visor main body, it is possible to form a sun visor main body that has a narrower thickness. Accordingly, even if the vehicle occupant makes an inertial movement in a diagonally forward direction, or if the vehicle occupant makes an inertial movement in a forward direction, the head portion of the vehicle occupant is prevented from striking the sun visor main body.

The vehicle sun visor according to the fourth aspect of the present disclosure, wherein a top surface of the sun visor main body in a case in which the sun visor main body has been set in the storage position is formed as a planar surface when seen in a side view from the vehicle transverse direction, and an energy absorption component is provided inside the sun visor main body.

According to the fourth aspect of the present disclosure, the top surface of the sun visor main body when this has been set in the storage position is formed as a planar surface when seen in a side view from the vehicle transverse direction, and an energy absorption component is provided inside the sun visor main body. Accordingly, any movement by the sun visor main body towards the vehicle body top side is obstructed by this top surface coming into contact with the ceiling. If, in this state, the head portion of a vehicle occupant then collides with the protruding portion, the impact force from this collision is absorbed by the energy absorption component of the sun visor main body. Accordingly, the impact force received by the head portion of the vehicle occupant is alleviated more effectively.

The vehicle sun visor according to the fifth aspect of the present disclosure, wherein a supporting rod that pivotably supports the one long-side edge portion of the sun visor main body is provided extending towards an inner side in the vehicle transverse direction at the front portion of the ceiling of the vehicle cabin, and when seen in a side view from the vehicle transverse direction, a top end portion of the supporting rod that is bent towards the vehicle body top side is attached to an end portion on the vehicle body rear side of a roof header that extends in the vehicle transverse direction.

According to the fifth aspect of the present disclosure, the top end portion, which is bent towards the vehicle body top side, of the supporting rod that pivotably supports the one long-side edge portion of the sun visor main body is attached to an end portion on the vehicle body rear side of the roof header. Accordingly, compared to a structure in which the top end portion of the supporting rod is attached to a substantially central portion in the vehicle body front-rear direction of the roof header, the sun visor main body can be positioned further to the vehicle body rear side when it is set in the storage position. Accordingly, even if the vehicle occupant makes an inertial movement in a diagonally forward direction, or if the vehicle occupant makes an inertial movement in a forward direction, the head portion of the vehicle occupant is prevented from striking the sun visor main body.

According to the first aspect of the present disclosure, it is possible to alleviate the impact force received by the head portion of a vehicle occupant even if the vehicle is in a diagonal frontal collision and the vehicle occupant makes an inertial movement in a diagonally forward direction.

According to the first aspect of the present disclosure and to the fourth aspect of the present disclosure, it is possible to more effectively alleviate the impact force received by the head portion of a vehicle occupant.

According to the third aspect of the present disclosure and to the fifth aspect of the present disclosure, it is possible to prevent the head portion of the vehicle occupant from striking the sun visor main body.

BRIEF DESCRIPTION OF THE DRAWINGS

Exemplary embodiments of the present disclosure will be described in detail based on the following figures, wherein.

DETAILED DESCRIPTION

Hereinafter, embodiments of the present disclosure will be described in detail based on the drawings. Note that, for the sake of convenience in the description, an arrow UP that is shown where appropriate in each drawing indicates the vehicle top side, an arrow FR indicates the vehicle front side, and an arrow OUT indicates an outer side in the vehicle transverse direction. Moreover, in the following description, unless specifically stated otherwise, if up-down, front-rear, or left-right directions are described, then these refer to the up-down direction of the vehicle body, the front-rear direction of the vehicle body, and the left-right direction of the vehicle body (i.e. the vehicle transverse direction).

First Embodiment

Figure 1:
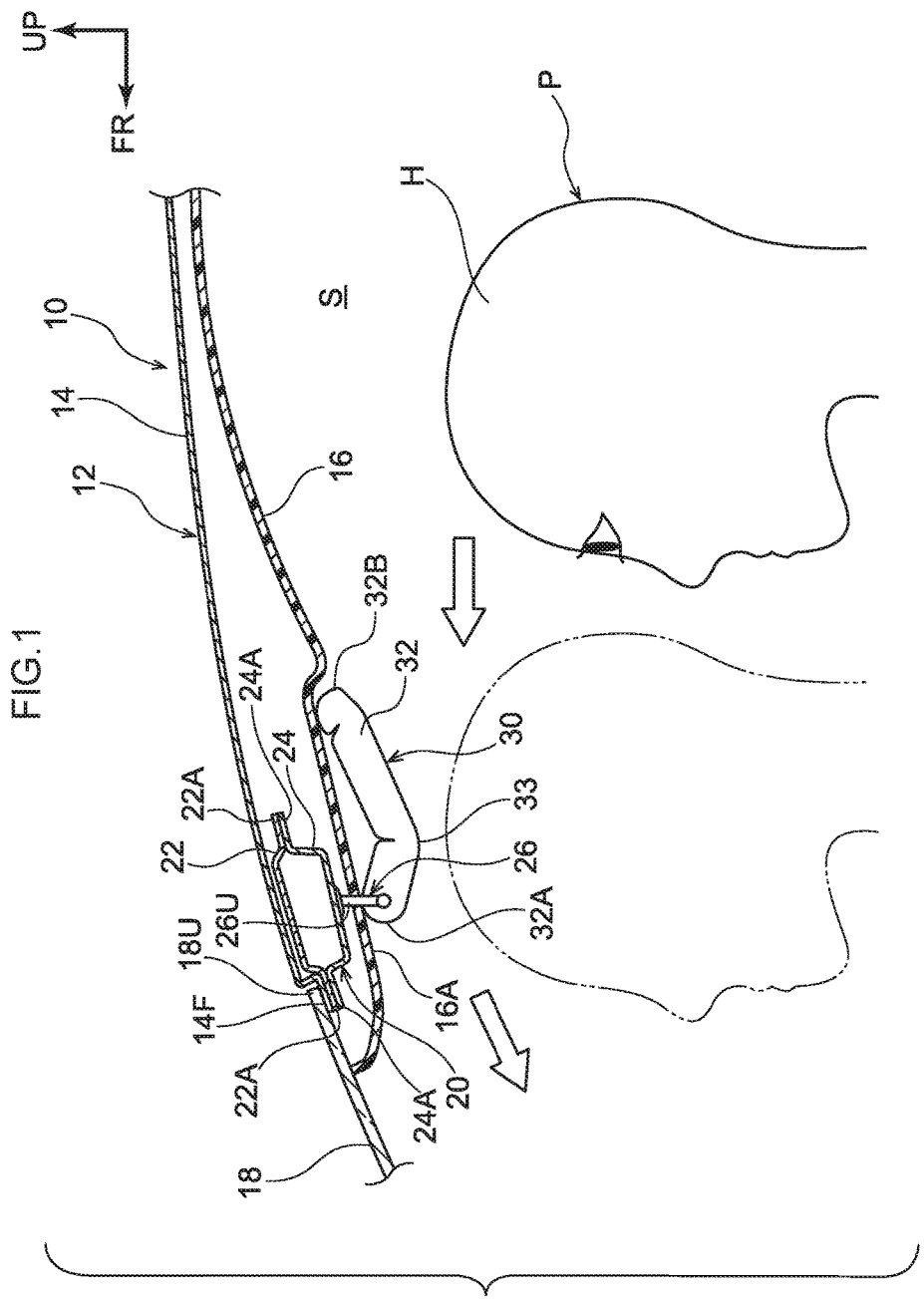
FIG. 1 is a vertical cross-sectional view showing a front portion of a ceiling of a vehicle that is provided with a vehicle sun visor according to a first embodiment.

Firstly, a sun visor for a vehicle (hereinafter, this may be referred to simply as a 'sun visor') 30 according to a first embodiment will be described. As is shown in FIG. 1, a vehicle 10 has a roof panel 14 which is a metal panel material that forms the framework of a ceiling 12, and a roof headlining 16 that is located on the vehicle body bottom side (i.e., a vehicle cabin S side) of the roof panel 14, and that together with the roof panel 14 makes up the ceiling 12.

The roof headlining 16 is a panel material made from resin that forms a design surface on the vehicle cabin S side of the ceiling 12, and is positioned such that it lies opposite the roof panel 14 in the vehicle body up-down direction. A storage recessed portion 16A which recesses towards the vehicle body top side is formed in a front portion of the roof headlining 16 in order that the sun visor 30 does not protrude too far towards the vehicle body bottom side (i.e., towards the vehicle cabin S side) when it has been set in the storage position (described below).

A roof header 20 that is made from metal and extends in the vehicle transverse direction is provided at the front-end bottom portion of the roof panel 14. In a vertical cross-sectional view as seen from the vehicle transverse direction, the roof header 20 can be seen to be formed by an upper header 22 that is formed substantially in a hat shape, and a lower header 24 that is also formed substantially in a hat shape. The roof header 20 is formed having a closed cross-sectional configuration as a result of flange portions 22A and 24A of the respective headers being joined together by spot-welding or the like.

A front end portion 14F of the roof panel 14 is joined from the vehicle body top side to the flange portion 22A on the vehicle body front side of the upper header 22. A top end portion 18U of a glass windshield 18 is joined from the vehicle body top side via a sealing component (not shown) to the front end portion 14F of the roof panel 14.

A top end portion 26U of a supporting rod 26 that is made from resin (alternatively, it may be made from metal) and pivotably supports the sun visor 30 is rotatably attached to an outer side in the vehicle transverse direction of the lower header 24 and in a substantially central portion thereof in the vehicle body front-rear direction.

Figure 2:
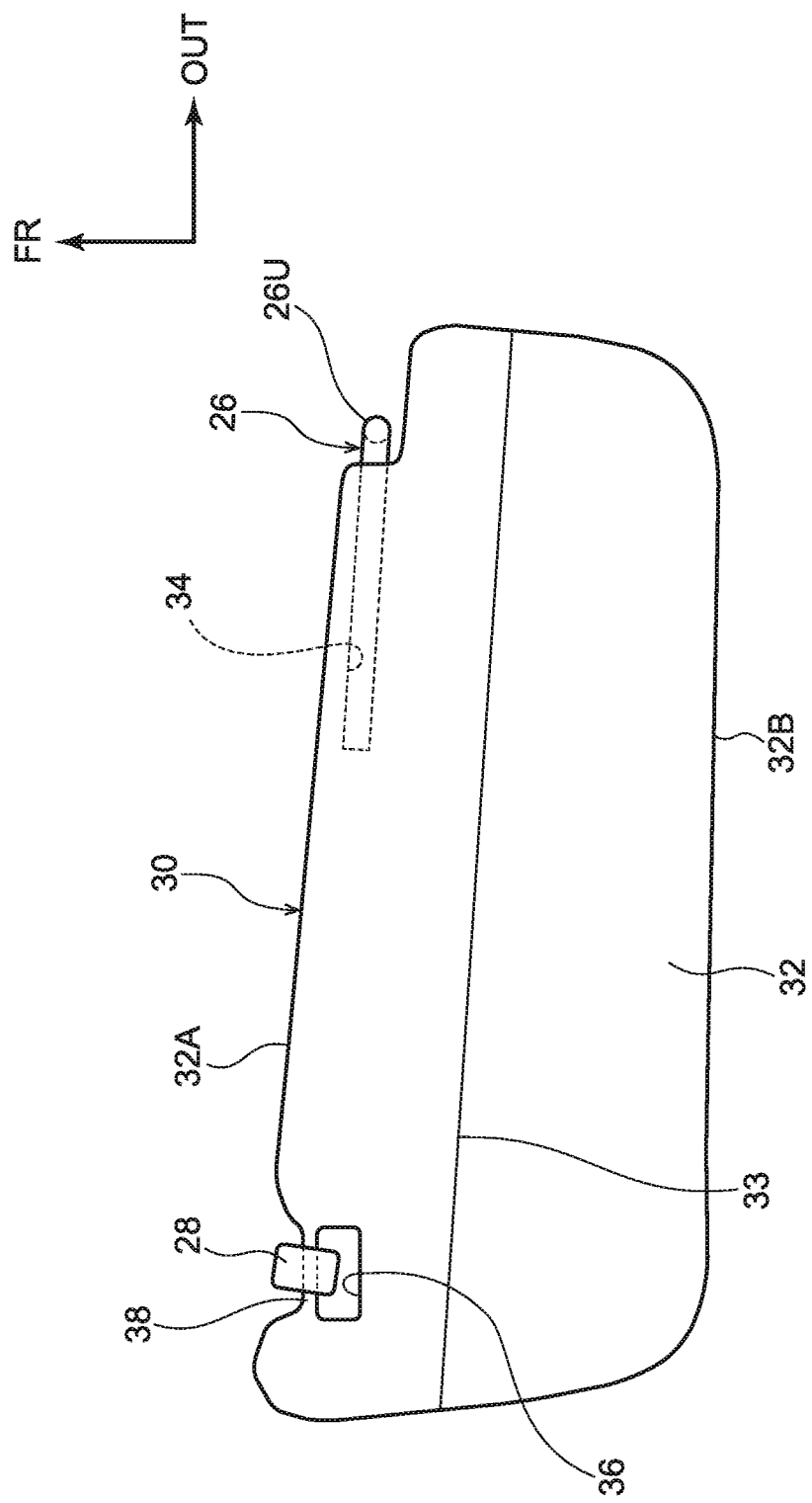
FIG. 2 is an enlarged bottom view as seen from underneath the vehicle body showing a sun visor set in a storage position on the left front seat side according to the first embodiment.

As is shown in FIG. 2, the supporting rod 26 is formed in a circular column shape and extends towards the inner side in the vehicle transverse direction. An end portion on the outer side in the vehicle transverse direction of the supporting rod 26 is molded such that it bends towards the vehicle body top side, and this portion forms the top end portion 26U. As is shown in FIG. 1, the top end portion 26U is inserted into a through hole that is formed on the outer side in the vehicle transverse direction and on the vehicle body front side of the storage recessed portion 16A of the roof headlining 16, and is rotatably attached to a bottom surface of the lower header 24.

Note that, as is shown in FIG. 2, a hook component 28 is provided on the inner side in the vehicle transverse direction, and on the vehicle body front side of the storage recessed portion 16A of the roof headlining 16. The hook component 28 is made from resin and is formed in a substantially "C"

shape in which the vehicle body rear side is the open side of the C when seen in a side view (i.e., in a vertical cross-sectional view) from the vehicle transverse direction. A connecting portion 38 (described below) that is formed on the sun visor 30 is able to be engaged from the vehicle body rear side with this hook component 28.

As is shown in FIG. 1 and FIG. 2, the sun visor 30 has a sun visor main body 32 that is formed in a substantially rectangular plate shape that extends in the vehicle transverse direction. Note that, as an example, the sun visor main body 32 may be formed by covering a resin, plate-shaped component with a covering component. A hole portion 34 into which the supporting rod 26 is inserted is formed extending inwards in the vehicle transverse direction in an end portion on the outer side in the vehicle transverse direction of one long-side edge portion (hereinafter, referred to as a 'pivot fulcrum portion') 32A of the sun visor main body 32.

A through hole 36 that has a substantially rectangular shape when seen in a bottom view from the vehicle body bottom side is formed adjacent to an end portion on the inner side in the vehicle transverse direction of the pivot fulcrum portion 32A of the sun visor main body 32. The substantially circular column-shaped connecting portion 38 whose axial direction extends in the vehicle transverse direction is formed integrally with the pivot fulcrum portion 32A on the pivot fulcrum portion 32A side of the through hole 36. This connecting portion 38 has a structure that enables it to be removably engaged with the hook component 28, and that enables it to rotate inside the hook component 28.

Accordingly, the sun visor main body 32 has a structure in which the end portion on the outer side in the vehicle transverse direction of the pivot fulcrum portion 32A is supported such that it is able to pivot around the supporting rod 26, and the vicinity of the end portion on the inner side in the vehicle transverse direction of the pivot fulcrum portion 32A (i.e., the connecting portion 38) is supported such that it is able to rotate inside the hook component 28. By employing this structure, another long-side edge portion (hereinafter, referred to as a rotational operation portion) 32B is able to rotate in the front and rear directions of the vehicle body around the supporting rod 26 and the connecting portion 38.

Note that a state in which the rotational operation portion 32B is rotated towards the vehicle body rear side so that the sun visor main body 32 is housed inside the storage recessed portion 16A (i.e., is placed against the ceiling 12) of the roof headlining 16 (i.e. the state shown in FIG. 1) is taken as the storage position (i.e., the storage state) of the sun visor 30. Moreover, although not shown in the drawings, a state in which the rotational operation portion 32B is rotated towards the vehicle body front side so that the sun visor main body 32 is concealing the top portion of the glass windshield 18 from the line of sight of a vehicle occupant P is a usage position (i.e., a usage state) of the sun visor 30.

Furthermore, by disengaging the connecting portion 38 from the hook component 28 and rotating the sun visor main body 32 towards the outer side in the vehicle transverse direction around the top end portion 26U of the supporting rod 26, the sun visor 30 can also be set in a state in which it conceals the top portion of the front door glass window (not shown) from the line of sight of the vehicle occupant P. This state is also a usage position (i.e., a usage state) of the sun visor 30.

A protruding portion 33 that protrudes towards the vehicle body bottom side when seen in a side view (i.e., in a vertical cross-sectional view) from the vehicle transverse direction is formed on a bottom surface of the sun visor main body 32 when this is set in the storage position, and between a central portion in the vehicle body front-rear direction and the pivot fulcrum portion 32A. This protruding portion 33 protrudes at an obtuse angle towards the vehicle body bottom side, and is formed as a result of the sun visor main body 32 being bent in a substantially V-shape when seen in a side view (i.e., in a vertical cross-sectional view) from the vehicle transverse direction.

Note that a vanity mirror (not shown) is provided integrally with the top surface side of the sun visor main body 32 when this is set in the storage position. An opening and closing cover (not shown) that leaves the vanity mirror closed when it is not in use is also provided on the top surface side of the sun visor main body 32 when this is set in the storage position.

An operation of the vehicle sun visor 30 according to the first embodiment which has the above-described structure will now be described.

The protruding portion 33 that protrudes towards the vehicle body bottom side is formed on the bottom surface of the sun visor main body 32 of the sun visor 30 when this is set in the storage position. Accordingly, when the vehicle 10 is in a diagonal frontal collision and the vehicle occupant P makes an inertial movement in a diagonally forward direction, the head portion H of this vehicle occupant P collides with the protruding portion 33 that is formed on the bottom surface of the sun visor main body 32.

When the head portion H of the vehicle occupant P collides with the protruding portion 33 of the sun visor main body 32, the head portion H of the vehicle occupant P is guided by the protruding portion 33 of the sun visor main body 32 towards the vehicle body bottom side. As a result, it is possible to prevent the head portion H of the vehicle occupant P from striking (i.e., becoming caught on) the pivot fulcrum portion 32A, namely, the supporting rod 26 and the hook component 28 that form the pivoting center of the sun visor main body 32. In other words, the impact force received by the head portion H of the vehicle occupant P is alleviated by this sun visor 30.

Moreover, if the head portion H of the vehicle occupant P collide with the protruding portion 33, the sun visor main body 32 is elastically deformed towards the vehicle body top side, so that the impact force has been effectively absorbed before the head portion H of the vehicle occupant P comes into contact with the underside of the roof headlining 16 (i.e., the ceiling 12) via the sun visor main body 32. Accordingly, it is possible to more effectively alleviate the impact force received by the head portion H of the vehicle occupant P, and the head portion H of the vehicle occupant P can be protected. Note that the same type of effects are also achieved when the vehicle 10 is in a frontal collision as well.

Because the protruding portion 33 that protrudes towards the vehicle body bottom side when seen in a side view (i.e., in a vertical cross-sectional view) from the vehicle transverse direction is formed on the bottom surface of the sun visor main body 32 when this is set in the storage position, the pivot fulcrum portion 32A side of the sun visor main body 32 when this is set in the storage position can be obscured from the view of the vehicle occupant P. Accordingly, the attractiveness of the area surrounding the sun visor 30 as seen from the viewpoint of the vehicle occupant P can be improved.

According to the vehicle sun visor 30 according to the first embodiment, simply by suitably modifying the shape of the sun visor main body 32, even if the vehicle 10 is in a diagonal frontal collision and the vehicle occupant P makes an inertial movement in a diagonally forward direction, or if the vehicle 10 is in a frontal collision and the vehicle occupant P makes an inertial movement in a forward direction, it is possible to protect the head portion H of the vehicle occupant P. Accordingly, this structure has the advantage that, in comparison with a structure in which a vehicle occupant protective device such as an airbag or the like is provided independently in the ceiling 12 of the vehicle 10, manufacturing costs can be kept low.

Second Embodiment

Next, a vehicle sun visor 30 according to a second embodiment will be described. Note that portions that are the same as in the above-described first embodiment are given the same descriptive symbols and any detailed description thereof (including common operations) is omitted where appropriate.

Figure 3:
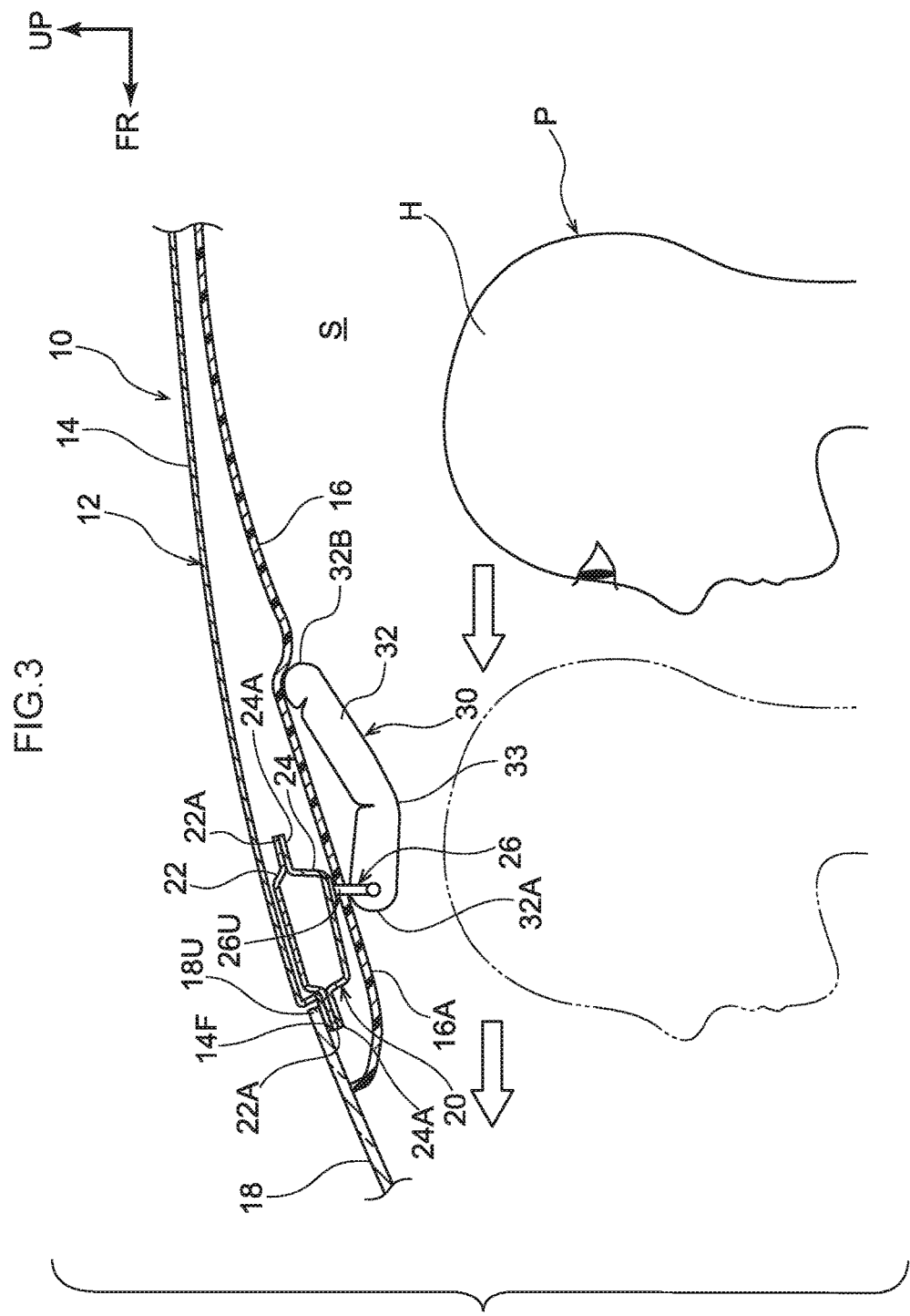
FIG. 3 is a vertical cross-sectional view corresponding to FIG. 1 showing a front portion of a ceiling of a vehicle that is provided with a vehicle sun visor according to a second embodiment.

As is shown in FIG. 3, the vehicle sun visor 30 according to the second embodiment differs from that of the first embodiment only in the position where the supporting rod 26 is attached to the lower header 24 of the roof header 20. Namely, the top end portion 26U of the supporting rod 26 in the second embodiment is rotatably attached to the outer side in the vehicle transverse direction of the lower header 24 and to the end portion on the vehicle body rear side thereof (excluding the flange portion 24A).

Accordingly, compared to a structure in which the top end portion 26U of the supporting rod 26 is attached to the outer side in the vehicle transverse direction of the lower header 24 and to a substantially central portion in the vehicle body front-rear direction, the sun visor main body 32 is positioned further to the vehicle body rear side when it is set in the storage position. Accordingly, when the vehicle 10 is in a diagonal frontal collision and the vehicle occupant P makes an inertial movement in a diagonally forward direction, or when the vehicle 10 is in a frontal collision and the vehicle occupant P makes an inertial movement in a forward direction, the sun visor 30 can be moved away from the movement trajectory of the head portion H of the vehicle occupant P.

Namely, according to the vehicle sun visor 30 according to the second embodiment, even if the vehicle 10 is in a diagonal frontal collision and the vehicle occupant P makes an inertial movement in a diagonally forward direction, or if the vehicle 10 is in a frontal collision and the vehicle occupant P makes an inertial movement in a forward direction, it is possible to prevent the head portion H of the vehicle occupant P from striking (i.e., becoming caught on) the sun visor main body 32, and on the pivot fulcrum portion 32A, namely, the supporting rod 26 and the hook component 28 that form the pivoting center of the sun visor main body 32.

Third Embodiment

Next, a vehicle sun visor (hereinafter, this may be referred to simply as a 'sun visor') 40 according to a third embodiment will be described. Note that portions that are the same as in the above-described first embodiment and second embodiment are given the same descriptive symbols and any detailed description thereof (including common operations) omitted where appropriate.

Figure 4:
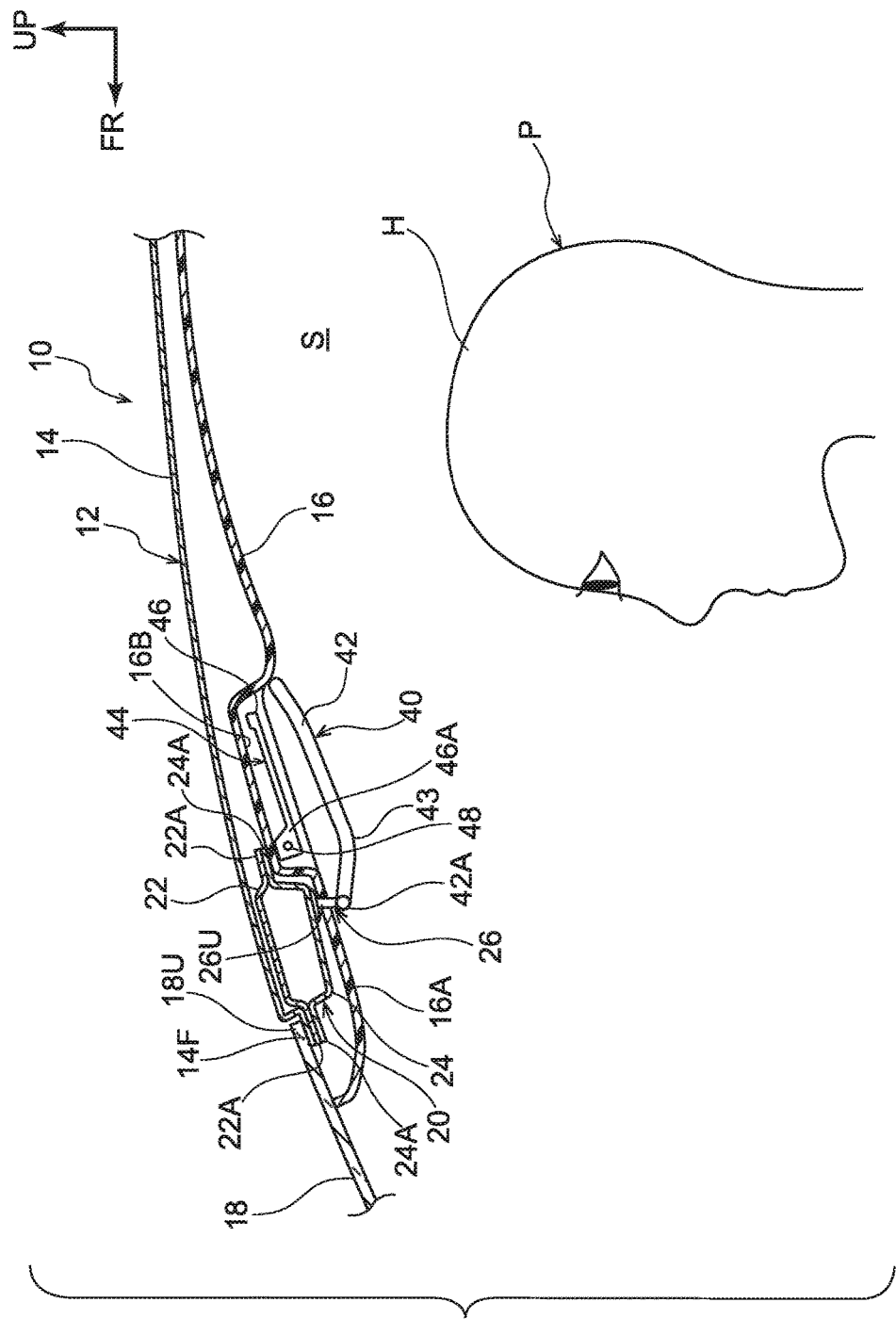
FIG. 4 is a vertical cross-sectional view corresponding to FIG. 1 showing a front portion of a ceiling of a vehicle that is provided with a vehicle sun visor according to a third embodiment.

As is shown in FIG. 4, the vehicle sun visor 40 according to the third embodiment differs from that of the above-described second embodiment only in that a sun visor main body 42 is formed thinner than the sun visor main body 32 of the above-described first embodiment and second embodiment. Namely, the vehicle sun visor 40 according to the third embodiment has a structure in which a protruding portion 43 of the same type as the protruding portion 33 is formed, however, a vanity mirror 44 is not provided in the sun visor main body 42.

More specifically, a built-in recessed portion 16B that recesses in a substantially rectangular shape even further towards the vehicle body top side is formed in a rear end portion of the storage recessed portion 16A of the roof headlining 16 (i.e., on the vehicle body rear side of the supporting rod 26). The length in the vehicle transverse direction of the built-in recessed portion 16B is shorter than the length in the vehicle transverse direction of the sun visor 40 (i.e. in the longitudinal direction thereof), and the vanity mirror 44 is housed inside this built-in recessed portion 16B.

Note that a state in which the vanity mirror 44 is housed inside this built-in recessed portion 16B is also the storage state of the vanity mirror 44. In the following description, when the expressions 'front', 'rear', and 'top' are used in relation to the vanity mirror 44, they refer to positions that take this storage state as a reference.

The vanity mirror 44 has a substantially plate-shaped main body portion 46 that is made from resin, and a mirror (not shown) is adhered to a top surface of this main body portion 46. In addition, vertical wall portions 46A that protrude towards the vehicle body top side are formed integrally with both sides in the vehicle transverse direction of a front end portion of the main body portion 46. Circular column-shaped pivot shafts 48 that protrude outwards in the vehicle transverse direction are formed integrally on outer surfaces of the vertical wall portions 46A.

Engaging holes (not shown) into which the pivot shafts 48 can be inserted are formed in side walls on both sides in the vehicle transverse direction of the front end portion of the built-in recessed portion 16B. Accordingly, a structure is formed in which, as a result of the pivot shafts 48 being pivotably supported in these engaging holes, a rear end portion of the vanity mirror 44 (i.e., the main body portion 46) is able to pivot in the vehicle body front-rear directions around the pivot points created by the pivot shafts 48.

Note that the built-in recessed portion 16B is formed on the vehicle body rear side of the roof header 20, and the top end portion 26U of the supporting rod 26 that supports the sun visor main body 42 is pivotably attached to the lower header 24 on the outer side in the vehicle transverse direction and on the end portion on the vehicle body rear side thereof. Because of this, when the vanity mirror 24 is used, the rear end portion of the sun visor 40 is firstly rotated towards the vehicle body front side.

In this manner, in the vehicle sun visor 40 according to the third embodiment, because the vanity mirror 44 is provided independently of the sun visor main body 42, the plate thickness of the sun visor main body 42 can be formed more thinly than the plate thickness of the sun visor main body 32 of the above-described first and second embodiments.

Accordingly, even if the vehicle 10 is in a diagonal frontal collision and the vehicle occupant P makes an inertial movement in a diagonally forward direction, or if the vehicle 10 is in a frontal collision and the vehicle occupant P makes an inertial movement in a forward direction, the sun visor 40 which is provided with the protruding portion 43 can be moved away from the movement trajectory of the head portion H of the vehicle occupant P. In addition, a pivot fulcrum portion 42A side of the sun visor main body 42 when this is set in the storage position can be obscured from the view of the vehicle occupant P. Accordingly, the attractiveness of the area surrounding the sun visor 40 as seen from the viewpoint of the vehicle occupant P can be improved.

Fourth Embodiment

Next, a vehicle sun visor (hereinafter, this may be referred to simply as a 'sun visor') 50 according to a fourth embodiment will be described. Note that portions that are the same as in the above-described first through third embodiments are given the same descriptive symbols and any detailed description thereof (including common operations) is omitted where appropriate.

Figure 5:
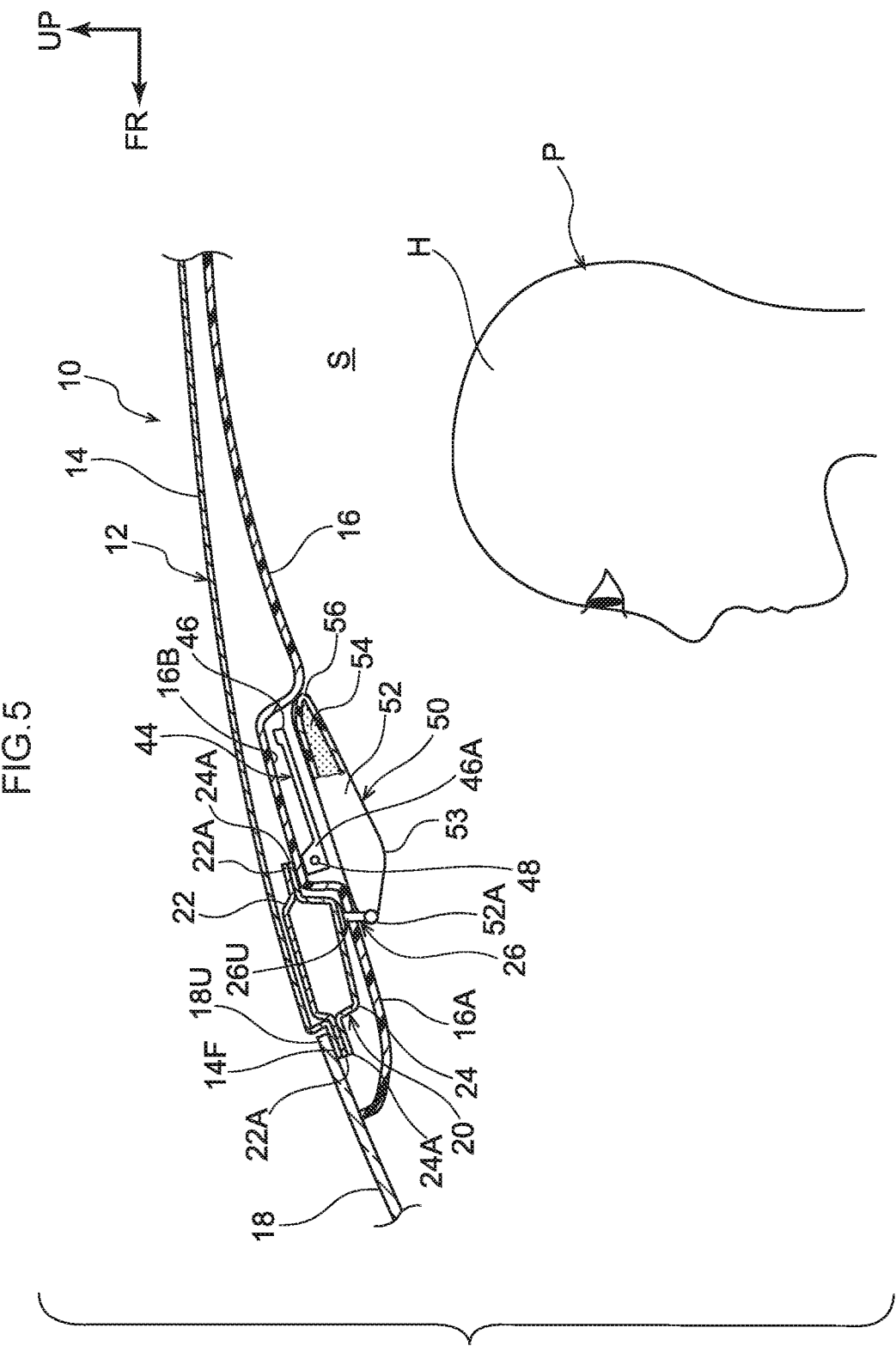
FIG. 5 is a vertical cross-sectional view corresponding to FIG. 1 showing a front portion of a ceiling of a vehicle that is provided with a vehicle sun visor according to a fourth embodiment.

As is shown in FIG. 5, the vehicle sun visor 50 according to the fourth embodiment differs from that of the second embodiment only in that a top surface of a sun visor main body 52 when this has been set in the storage position is formed as a planar surface when seen in a side view (i.e., in a vertical cross-sectional view) from the vehicle transverse direction, and an energy absorption component 54 is provided inside the sun visor main body 52.

For example urethane foam or the like may be considered for the energy absorption component 54, and the sun visor main body 52 is formed by covering this energy absorption component 54 with a covering component 56. A protruding portion 53 that protrudes towards the vehicle body bottom side when seen in a side view (i.e., in a vertical cross-sectional view) from the vehicle transverse direction is formed on a bottom surface of the sun visor main body 52 when this is set in the storage position, and between a central portion in the vehicle body front-rear direction and the pivot fulcrum portion 52A.

Note that in the same way as in the above-described third embodiment, in the vehicle sun visor 50 according to the fourth embodiment as well, a structure is employed in which the vanity mirror 44 is not provided in the sun visor main body 52. Namely, in the same way as in the above-described third embodiment, a structure is employed in which the vanity mirror 44 is pivotably housed inside the built-in recessed portion 16B.

In the vehicle sun visor 50 according to the fourth embodiment which has the above-described structure, because the top surface of the sun visor main body 52 when this has been set in the storage position is formed as a planar surface, any movement towards the vehicle body top side is obstructed by this top surface coming into contact with the roof headlining 16 (i.e., the ceiling 12) on both the outer side in the vehicle transverse direction and the inner side in the vehicle transverse direction of the built-in recessed portion 16B.

Accordingly, when the head portion H of a vehicle occupant P collides with the protruding portion 53 of the sun visor main body 52, the impact force of this collision is effectively absorbed by the energy absorption component 54 that is built into the sun visor main body 52. In other words, according to this sun visor 50, it is possible to more effectively alleviate the impact force received by the head portion H of the vehicle occupant P, and the head portion H of the vehicle occupant P can be protected.

The vehicle sun visors 30, 40, and 50 according to the above-described embodiments have been described above based on the drawings, however, the vehicle sun visors 30, 40, and 50 according to the above-described embodiments are not limited to those illustrated above, and various appropriate design modifications and the like may be made thereto insofar as they do not depart from the spirit or scope of the present disclosure. For example, the vertical cross-sectional configurations of the protruding portions 33, 43, and 53 as seen from the vehicle transverse direction are not limited to the obtuse angle illustrated in the drawings, and they may also be formed in a circular arc shape.

Furthermore, the present disclosure is not limited to a structure in which the protruding portion 33 of the first embodiment and the second embodiment, and the protruding portion 43 of the third embodiment are formed respectively by bending the sun visor main bodies 32 and 42 in a substantially V-shape when seen in a side view (i.e., in a vertical cross-sectional view) from the vehicle transverse direction. Moreover, in the fourth embodiment, provided that a structure is employed that is able to obstruct the movement of the sun visor main body 52, which has been set in the storage position, towards the vehicle body top side, then it is not essential for the top surface of a sun visor main body 52 when this has been set in the storage position to be formed as a planar surface when seen in a side view (i.e., in a vertical cross-sectional view) from the vehicle transverse direction.

Furthermore, in the same way as in the second embodiment, the top end portion 26U of the supporting rod 26 of the third embodiment and the fourth embodiment is pivotably attached to an outer side in the vehicle transverse direction of the lower header 24 and on the end portion on the vehicle body rear side thereof, however, the present disclosure is not limited to this. Namely, in the same way as in the first embodiment, it is also possible for the top end portion 26U of the supporting rod 26 of the third embodiment and the fourth embodiment to be pivotably attached to an outer side in the vehicle transverse direction of the lower header 24 and in a substantially central portion thereof in the vehicle body front-rear direction.

What is claimed is:
1. A vehicle sun visor comprising:
a sun visor main body that is formed in a substantially rectangular plate shape that extends in a vehicle transverse direction, the sun visor main body having one long-side edge portion that is pivotably supported by a supporting rod, which is provided extending towards an inner side in the vehicle transverse direction and which is formed in a cylindrical shape at a front portion of a ceiling inside a vehicle cabin, the sun visor main body being set in a storage position along the ceiling as a result of another long-side edge portion being pivoted towards a vehicle body rear side, and the sun visor main body being formed at substantially the same thickness as a diameter of the supporting rod;
a vanity mirror that is pivotably provided, on the ceiling, independent from the sun visor main body; and
a protruding portion that is formed on a bottom surface of the sun visor main body in a case in which the sun visor main body has been set in the storage position, the protruding portion protrudes from a design surface of the ceiling formed by a roof headlining towards a vehicle bottom side when seen in a side view from the vehicle transverse direction in a case in which the sun visor main body has been set in the storage position, the protruding portion is made of resin, and the protruding portion is formed as a result of the sun visor main body being bent in a substantially V-shape when seen in the side view from the vehicle transverse direction;
the supporting rod pivotably supports the one long-side edge portion of the sun visor main body, a top end portion of the supporting rod that is bent towards the vehicle body top side is rotatably attached to an end portion on the vehicle rear side of a roof header that extends in the vehicle transverse direction.

2. A vehicle sun visor comprising:

a sun visor main body that is formed in a substantially rectangular plate shape that extends in a vehicle transverse direction, the sun visor main body having one long-side edge portion that is pivotably supported by a supporting rod, which is provided extending towards an inner side in the vehicle transverse direction and which is formed in a cylindrical shape at a front portion of a ceiling inside a vehicle cabin, and the sun visor main body being set in a storage position along the ceiling as a result of another long-side edge portion being pivoted towards a vehicle body rear side, and the sun visor main body being formed at substantially the same thickness as a diameter of the supporting rod;

a vanity mirror that is pivotably provided, on the ceiling, independently from the sun visor main body;

a protruding portion that is formed on a bottom surface of the sun visor main body in a case in which the sun visor main body has been set in the storage position, the protruding portion protrudes from a design surface of the ceiling formed by a roof headlining towards a vehicle bottom side when seen in a side view from the vehicle transverse direction, the protruding portion is made of resin, and the protruding portion is formed as a result of the sun visor main body being bent in a substantially V-shape when seen in the side view from the vehicle transverse direction; and the supporting rod pivotably supports the one long-side edge portion of the sun visor main body, a top end portion of the supporting rod that is bent towards the vehicle body top side is rotatably attached to an end portion on the vehicle body rear side of the roof header that extends in the vehicle transverse direction, the roof header is formed having a closed cross sectional configuration when seen in the side view from the vehicle traverse direction.

3. The vehicle sun visor according to claim 2, wherein the roof header includes an upper header that is formed substantially in a hat shape and a lower header that is formed substantially in a hat shape.

4. The vehicle sun visor according to claim 3, wherein the upper header includes upper header flanges that form a portion of the hat shape of the upper header, and wherein the lower header includes lower header flanges that form a portion of the hat shape of the lower header.

5. The vehicle sun visor according to claim 4, wherein the upper header flanges and the lower header flanges are joined together to form the closed cross sectional configuration of the roof header when seen in the side view from the vehicle traverse direction.

6. The vehicle sun visor according to claim 5, wherein the top end portion of the supporting rod is attached to the lower header.

7. The vehicle sun visor according to claim 1, wherein the storage position is a position in which the sun visor main body is housed inside a storage recessed portion of the roof headlining, and that in the storage position the protruding portion protrudes from the design surface of the ceiling towards a vehicle body bottom side.

8. The vehicle sun visor according to claim 7, wherein the vanity mirror is pivotably provided on the roof headlining on the vehicle top side of the sun visor main body in the storage position.

9. The vehicle sun visor according to claim 2, wherein the storage position is a position in which the sun visor main body is housed inside a storage recessed portion of the roof headlining, and that in the storage position the protruding portion protrudes from the design surface of the ceiling towards a vehicle body bottom side.

10. The vehicle sun visor according to claim 9, wherein the vanity mirror is pivotably provided on the roof headlining on the vehicle top side of the sun visor main body in the storage position.

11. The vehicle sun visor according to claim 1, wherein the sun visor main body is pivotal between the storage position and a usage position, in the storage position the sun visor main body covers the vanity mirror.

12. The vehicle sun visor according to claim 2, wherein the sun visor main body is pivotal between the storage position and a usage position, in the storage position the sun visor main body covers the vanity mirror.

* * * * *